United States Patent [19]

Beck

[11] 3,725,323

[45] Apr. 3, 1973

[54] CYCLOHEXYLAMMONIUM N-CYCLOHEXYLSULFMATE AS RESIN CATALYSTS

[75] Inventor: Karl Maurice Beck, Lake Bluff, Ill.

[73] Assignee: Abbott Laboratories, Chicago, Ill.

[22] Filed: July 27, 1971

[21] Appl. No.: 166,604

[52] U.S. Cl.............260/17.3, 161/261, 260/29.4 R, 260/71
[51] Int. Cl.......C08g 9/10, C08g 51/18, C08g 51/24
[58] Field of Search........260/17.3, 71, 29.4, 67.6, 70

[56] References Cited

UNITED STATES PATENTS 2,201,762  5/1940  Cupery...................................260/71
2,469,137  5/1949  Cordier................................260/17.3
2,561,973  7/1951  Cohen......................................260/71
3,317,588  5/1967  Shah.......................................260/501
3,544,619  12/1970  Yamaguchi.....................260/501.12

FOREIGN PATENTS OR APPLICATIONS 990,596  4/1965  Great Britain........................260/500
1,015,107  12/1965  Great Britain......................260/500

Primary Examiner—William H. Short
Assistant Examiner—Edward Woodberry
Attorney—Robert L. Niblack et al.

[57] ABSTRACT

Formaldehyde-urea resins are catalyzed to form a solid resin of excellent bonding strength, using cyclohexylammonium N-cyclohexylsulfamate in small amounts for curing the resin at elevated temperatures.

7 Claims, No Drawings

CYCLOHEXYLAMMONIUM N-CYCLOHEXYLSULFMATE AS RESIN CATALYSTS

DETAILED DESCRIPTION OF THE INVENTION

Urea-formaldehyde resins have been used in many industries to form a hard, cured resin and it has been known that the reaction between the two materials requires the use of a catalyst to accelerate the formation of a hard, cured resin even at elevated temperatures. Many compounds have been suggested and are being used as catalyst for this resin cure but most of those presently commercially exploited are deficient in one or more respects. For instance, ammonium sulfate produces rapid gelling of the resin mixture so that when it is added to the formaldehyde/urea mixture, the combination must be placed in its final form soon after mixing. In other words, the resin/catalyst mixture has a pot life too short for many applications. Other resin catalysts commercially used possess a very long pot life, i.e., a batch of the resin/catalyst mixture can be kept at room temperature for a week or longer without unduly increasing the viscosity of the mixture. Unfortunately, such mixtures fail when tackiness is required like in the manufacture of particle boards in the caulless process where a mat is formed at room temperature and this mat is unsupported for that short period of time wherein it is being fed over a roller into trays prior to being pressed into its final shape in the oven. When a catalyst is used that has a short pot life, the resin sets prior to being formed into its ultimate shape and if the catalyst produces insufficient tackiness at room temperature, the particle board mat must be supported from all sides and at all times prior to placing it in the curing oven.

It is therefore an object of the present invention to provide a process for curing formaldehyde/urea resins which produce a tacky mixture at room temperature upon adding the curing catalyst; it is another object of this invention to provide a process for curing formaldehyde/urea resins with a catalyst which produces extended pot life at room temperature. It is still another object of the present invention to provide a catalyst for urea/formaldehyde curing that produces a fully cured, hard resin in a short heating period.

These and other objects are accomplished by providing a process for the curing of a urea/formaldehyde resin consisting essentially in heating a urea/formaldehyde resin mixture in the presence of 0.1–5.0 percent by weight of cyclohexylammonium N-cyclohexylsulfamate to a temperature of 100–250° C. for several minutes. The viscosity of the new mixture comprising formaldehyde, urea and cyclohexylammonium N-cyclohexylsulfamate does not unduly increase at room temperature and is therefore useable for extended periods of time. Its storage stability can be further improved by increasing its pH to the range of about 7.0 to about 8.5 by the addition of small amounts of an alkaline material such as sodium hydroxide, potassium hydroxide, ammonium hydroxide or triethylamine.

The new catalyst can be added to a mixture of the resin alone or to a resin mixture which is incorporated into a mass of particles which are to be place into a final hard shape. The mixture is particularly useful in the particle board industry which in the past has used formaldehyde/urea resins in large quantities. In this process, wood fibers or particles are thoroughly blended with urea/formaldehyde resin and a catalyst which, upon heating and pressing, converts the mixture into a hard, cured resin. Heating is ordinarily done in a heating press wherein the platens are heated to temperatures above 100° C. for a short period of time. The shorter the required heating and press time, the more efficient the press can be used. Only relatively small amounts of an efficient catalyst are needed to catalyze the reaction between urea and formaldehyde at temperatures and press times ordinarily used in various industries. With catalyst amounts of between 0.1 and 5 percent by weight of the resin, the new catalyst provides full cures in press times of between 2.5 and 5 minutes. While this can be accomplished with other catalysts presently known, the newly provided cyclohexylammonium N-cyclohexylsulfamate produces the desired tackiness in the resin mixture almost immediately without unduly increasing its viscosity. This is an immense advantage in particle board manufacture where caulless machines are used: the particles are being sprayed with the mixture of formaldehyde/urea/cyclohexylammonium N-cyclohexylsulfamate which can be made up in large batches that are useful for 7 to 14 days at room temperature; the wood particles/resin/catalyst mixture immediately becomes tacky enough at room temperature to be loaded over rollers into the caulless machine wherein several mats are placed in tiers which then move into the oven for a short curing and pressing period so that several boards can be made simultaneously in the same press.

In order to show the properties of boards made by this procedure with the new catalyst, reference is made to the following examples, which however, are not intended to limit this invention in any respect. In these examples, all parts and percentages are to be understood as parts or percents by weight.

Example 1

Inland Douglas-fir lumber chips were hammermilled and separated into −6 +9 and −9 +14 (Tyler screen designations) fractions by means of a vibrating screen. In order to obtain a sufficient −9 +14 fraction, some of the −6 +9 material was ground in a single-disc attrition mill. The final furnish for this study then contained about 50 percent of each of the designated fractions which had a final screen designation of −6 +14.

All particles were randomized and dried to a moisture content of 3 percent and the particle boards produced from these particles were made to the following specification using the listed parameters:

Board size: 1.75 × 37.5 cm
Specific gravity: 0.65 g/cm³
Resin level: 7 percent based on oven-dry weight of wood
Mat moisture content into press: 7–7.5 percent
Press closing time: 1 minute (measured from time press starts to compress the mat)

The numerous boards produced in this study all contained the same general particle size; they were randomly mixed to yield homogeneous boards. Testing was mainly directed to the internal bond properties which is most directly influenced by the adhesive action of the resin. A press closing time of one minute was used in order to produce boards with high density surface layers and a lower density core layer which would make the core layer more vulnerable to internal bond test failures than the surface layer.

Catalyst levels of 0.5, 1.0 and 2.0 percent by weight based on the solid weight of the resin composition were used and press temperatures of 194°, 177° and 160° C. were employed. Two different commercial types of formaldehyde-urea resins (marketed by Pacific Resins and Chemicals, Inc.) were used: Composition A was uncatalyzed and classified as having a moderate cure speed; Composition B contained 0.5 percent by weight (based on resin solids) of a catalyst system designed for Douglas-fir to promote faster resin cure. Both resins had a solids content of 65 percent and were used as an aqueous solution in commercially recommended amounts.

The samples using the resin catalyst of the present invention at the levels indicated use commercial resin Composition A in the same fashion as where Composition A is used alone. Catalyst and resin were always mixed prior to spraying.

Press times were varied with press temperatures because of the different times necessary to raise the board core temperature to 105° C. The latter is reached in a relatively short time and depends mainly on the press platen temperatures. The measurements listed below were taken 2.5 cm. away on a diagonal from a corner of the pressed boards since corners are the last part of the board to reach full core temperature. Once the temperature of 105° C. was reached, little change was noted in the core temperature of the boards at the corner. The press times established for the three cure temperatures were as follows:

at 194° C., 2.5 min. was the fastest press time
at 177° C., 3.5 min. was the fastest press time
at 160° C., 4.0 min. was the fastest press time In each instance, a second board was pressed 30 seconds longer than the fastest press time established with the first board, and two more boards were pressed for even longer periods at each of the above temperatures to determine significant bonding changes with short press time extensions and to establish maximum bonding properties that could be expected.

Conventional laboratory procedures were employed for producing experimental boards. Sufficient material for a batch of four boards was blended in a rotary drum blender and the resin was sprayed onto the furnish through an air atomizing nozzle. All resins were warmed to 25° C. before spraying to insure the same viscosity and droplet size in all experiments.

Material for each board was hand felted into a deckle box and the resultant mat was prepressed prior to hot pressing the mat into the final board. The press was electrically heated with the temperature controlled by means of thermistor probes in the individual platens. The press was closed to stop in one minute in all instances to develop the same layer density in all boards.

Internal bond evaluations were conducted on all boards according to ASMT D-1037, "Methods of Evaluating the Properties of Wood-Base Fiber and Particle Panel Materials." Two specimens were selected from an edge and two from the interior of the board, making a total of four per board. Specimens were cut from the same location in each board.

Modulus of rupture evaluations were conducted on two specimens from each board pressed at 194° C. It was felt that these tests established the modulus of rupture property that should be expected from all boards because the previously mentioned higher density surface layers should be similar in all boards. In addition, the resin was fully cured in these layers because adequate heat for curing was supplied to the surface layers well before the core temperature of 105° C. was reached. All specimens were conditioned approximately four days in an atmosphere of 65 percent relative humidity and 21° C. before testing.

Tables I–III contain the summarized test data for this study. No corrections were made for specific gravity as the average values observed were close to the specified level of 0.65 g/cm.

In the boards produced for this study, a maximum internal bond strength of 175–180 psi is expected. At 194° C. the resin catalyzed with cyclohexylammonium N-cyclohexylsulfamate at the ½ percent and 1 percent levels matched the commercially catalyzed resin at a press time of 2.5 minutes although maximum bonding was not quite reached. Two percent of cyclohexylammonium N-cyclohexylsulfamate yielded boards that almost achieved maximum bonding at a presstime of 2.5 minutes. It required 4.5 minutes for the uncatalyzed resin to produce completely bonded boards.

When the press temperature was reduced to 177° C., the boards produced at all three levels of cyclohexylammonium N-cyclohexylsulfamate reached maximum bond strength in 3.5 minutes. It required over 4 minutes for the boards with commercially catalyzed resin to become completely cured while boards with uncatalyzed resin required approximately 5 minutes for maximum bonding to occur.

Only one set of boards were made for the resin treatments at 160° C. Boards at all three levels of cyclohexylammonium N-cyclohexylsulfamate were felt to have achieved complete bonding in 4 minutes. Those boards made by using 1 percent of cyclohexylammonium N-cyclohexylsulfamate showed slightly lower bonding values which may be attributed to experimental error since only one set of boards was tested.

TABLE I

[Physical property values of experimental Douglas-fir particle boards made with five different resin treatments at a press temperature of 194° C.]

| Treatment | Press time, min. | Modulus of rupture | | Internal bond | |
|---|---|---|---|---|---|
| | | Sp. gr. | P.s.i. | Sp. gr. | P.s.i. |
| Resin composition A | 2.5 | 0.64 | 1,875 | 0.64 | 99 |
| | 3.0 | 0.65 | 2,000 | 0.65 | 145 |
| | 4.5 | 0.65 | 1,980 | 0.65 | 170 |
| | 6.0 | 0.65 | 1,950 | 0.65 | 165 |
| Resin composition B | 2.5 | 0.65 | 1,950 | 0.65 | 165 |
| | 3.0 | 0.67 | 1,970 | 0.66 | 169 |
| | 4.5 | 0.67 | 2,085 | 0.67 | 183 |
| | 6.0 | 0.67 | 1,840 | 0.67 | 176 |
| ½% cyclohexylammonium N-cyclohexylsulfamate in resin composition A | 2.5 | 0.64 | 1,880 | 0.64 | 138 |
| | 3.0 | 0.65 | 2,025 | 0.66 | 169 |
| | 4.5 | 0.66 | 1,935 | 0.66 | 178 |
| | 6.0 | 0.66 | 1,945 | 0.66 | 179 |
| 1% cyclohexylammonium N-cyclohexylsulfamate in resin composition A | 2.5 | 0.64 | 1,795 | 0.63 | 139 |
| | 30. | 0.65 | 1,765 | 0.65 | 163 |
| | 4.5 | 0.65 | 1,830 | 0.64 | 167 |
| | 6.0 | 0.65 | 1,785 | 0.65 | 171 |
| 2% cyclohexylammonium N-cyclohexylsulfamate in resin composition A | 2.5 | 0.65 | 1,915 | 0.65 | 165 |
| | 3.0 | 0.65 | 1,915 | 0.66 | 176 |
| | 4.5 | 0.65 | 1,845 | 0.65 | 175 |
| | 6.0 | 0.65 | 1,805 | 0.65 | 165 |

TABLE II

Internal bond values of experimental Douglas-fir particle boards made with five different resin treatments at a press temperature of 177°C.

| Treatment | Press Time (Min.) | Internal Bond Sp.Gr. | Psi |
|---|---|---|---|
| Resin Composition A | 3.5 | 0.64 | 136 |
| | 4.0 | 0.65 | 155 |
| | 5.0 | 0.65 | 170 |
| | 7.0 | 0.65 | 179 |
| Resin Composition B | 3.5 | 0.64 | 151 |
| | 4.0 | 0.64 | 159 |
| | 6.0 | 0.65 | 171 |
| 1/2% Cyclohexylammonium N-Cyclohexylsulfamate in Resin Composition A | 3.5 | 0.65 | 169 |
| | 4.0 | 0.66 | 178 |
| | 5.0 | 0.65 | 174 |
| | 7.0 | 0.65 | 176 |
| 1% Cyclohexylammonium N-Cyclohexylsulfamate in Resin Composition A | 3.5 | 0.65 | 175 |
| | 4.0 | 0.66 | 181 |
| | 5.0 | 0.66 | 184 |
| | 7.0 | 0.65 | 175 |
| 2% Cyclohexylammonium N-Cyclohexylsulfamate in Resin Composition A | 3.5 | 0.65 | 180 |
| | 4.0 | 0.65 | 179 |
| | 5.0 | 0.65 | 175 |
| | 7.0 | 0.65 | 180 |

TABLE III

Internal bond values of experimental Douglas-fir particle boards made with five different resin treatments at a press temperature of 160°C.

| Treatment | Press Time (min) | Internal Bond Sp.Gr. | Psi |
|---|---|---|---|
| Resin Composition A | 4.0 | 0.65 | 150 |
| | 4.5 | 0.65 | 164 |
| | 5.0 | 0.64 | 167 |
| | 7.0 | 0.65 | 177 |
| Resin Composition B | 4.0 | 0.65 | 167 |
| | 4.5 | 0.65 | 179 |
| | 5.0 | 0.66 | 174 |
| | 7.0 | 0.66 | 178 |
| 1/2% Cyclohexylammonium N-Cyclohexylsulfamate in Resin Composition A | 4.0 | 0.64 | 174 |
| | 4.5 | 0.65 | 180 |
| | 5.0 | 0.66 | 174 |
| | 7.0 | 0.65 | 180 |
| 1% Cyclohexylammonium N-Cyclohexylsulfamate in Resin Composition A | 4.0 | 0.64 | 163 |
| | 4.5 | 0.65 | 168 |
| | 5.0 | 0.66 | 169 |
| | 7.0 | 0.66 | 169 |
| 2% Cyclohexylammonium N-Cyclohexylsulfamate in Resin Composition A | 4.0 | 0.65 | 183 |
| | 4.5 | 0.65 | 178 |
| | 5.0 | 0.65 | 176 |
| | 7.0 | 0.65 | 166 |

It will be seen from the above tables that cyclohexylammonium N-cyclohexylsulfamate at all levels functions as an excellent catalyst for urea/formaldehyde resins and compares favorably with commercially used resin/catalyst mixtures.

Example 2

In this test, the same particles were used as in Example 1 and the particle boards were prepared in the same fashion except that to the particles using cyclohexylammonium N-cyclohexylsulfamate as the catalyst, 1 percent of a wax emulsion (based on the weight of the resin) was added and the above catalyst was used as a 4 percent equeous solution. The two additives were mixed and sprayed onto the wood particles simultaneously. The following properties were obtained with the particle boards pressed at 177° C. and tested in the manner shown in Example 1.

TABLE IV

| Press Time | Internal Bond Sp.Gr. |
|---|---|
| 3.5 minutes | 0.65 g/cm$^3$ 162 psi |
| 4.0 minutes | 0.67 g/cm$^3$ 171 psi |
| 5.0 minutes | 0.67 g/cm$^3$ 170 psi |

No break-down of any of the wax emulsions was observed, indicating that wax, as often used in the fiber and particle board industry, can safely be added to the resin/catalyst mixtures without detrimental effects on the expected bonding properties.

Example 3

In order to measure the pot life of cyclohexylammonium N-cyclohexylsulfamate, the viscosities of resin/catalyst mixtures were measured using Gardner Bubble Viscosimeters. About 15 g. of each resin formulation was placed in a standard tube of 11.25 × 1.07 cm. The tests were conducted by matching the vertical speed of a trapped air bubble of 25° C. with that of the nearest standard tube. Each tube contained 0.5 percent of the test catalyst and various amounts of a pH adjuster, i.e., ammonium hydroxide (AH) or triethylamine (TEA). Since it is known that such a test gives conservative readings, interperting the results given in Table V are meaningful mainly in comparison between formulations. For this comparison, the commercial catalysts described in Example 1 were used.

TABLE V

| Resin treatment | Percent and of buffer c | Viscosities in centipoise after - | | | | | | | | | |
|---|---|---|---|---|---|---|---|---|---|---|---|
| | | 0 hr. | 24 hrs. | 48 hrs. | 64 hrs. | 88 hrs. | 112 hrs. | 136 hrs. | 184 hrs. | 208 hrs. | 232 hrs. |
| Test compound | 1—AH | 85 | 85 | 85 | 85 | 85 | 100 | 100 | a 165 | a 225 | a 300 |
| | 2—AH | 85 | 85 | 85 | 85 | 85 | 85 | 85 | 85 | 85 | 85 |
| | 3—AH | 85 | 85 | 85 | 65 | 65 | 65 | 65 | 65 | 65 | 85 |
| | 4—AH | 85 | 85 | 85 | 65 | 65 | 65 | 65 | 65 | 65 | 85 |
| | 0.1—TEA | b 100 | a 100 | 100 | b 100 | b 100 | b 100 | (Gelled) | | | |
| | 0.4—TEA | b 85 | a b 85 | a 100 | a b 100 | b 140 | b 165 | | | | |
| | 0.7—TEA | b 85 | a b 85 | a 100 | a b 100 | a b 140 | a b 165 | (Gelled) | | | |
| Composition: A | | | 200 | 200 | b 200 | b 200 | b 225 | b 250 | | b 250 | b 250 |
| B | | | 200 | 200 | b 200 | b 200 | b 250 | b 275 | | b 435 | b 470 | a Showing signs of gelling.
b Add 8 hours for these entries.
c Based on the amount of resin solids.

For further comparison, 0.5 percent ammonium sulfate was also used as catalyst but the resin gelled within 24 hours and became unuseable and unsuitable.

Sodium hydroxide added to produce the same pH as attained in the above samples with ammonium hydroxide gave results almost identical to those reported for the latter in Table V.

On further observation beyond the time periods shown in the Table V, it was noted that at levels of 2 percent and 3 percent ammonium hydroxide, cyclohexylammonium N-cyclohexylsulfamate was good for 424 and 448 hours, respectively. This is about the same useful pot life as obtained with commercial, uncatalyzed resin, i.e., Composition A. At a buffer level of 4 percent, the viscosity of the test sample increased from 85 to 140 cps. in 496 hours which is superior to the result obtained with Composition A. The 0.7 percent level of triethylamine appears to give almost identical resin properties as the 4.0 percent level of ammonium hydroxide.

EXAMPLE 4

Boards were made from the particles described in Example 1 by the process identified there, using a level of 0.25 percent of cyclohexylammonium N-cyclohexylsulfamate as a 4 percent aqueous solution at two different press temperatures to determine the minimum time to achieve highest internal bond strength. The results are shown in Table VI.

TABLE VI

| Press Temperature | Press Time | Spec. Gr. | Bond Strength |
|---|---|---|---|
| 177°C. | 3.25 min. | 0.65 g/cm³ | 145 psi |
|  | 3.50 min. | 0.65 g/cm³ | 160 psi |
| 3.75 min. |  | 0.65 g/cm³ | 166 psi |
|  | 4.00 min. | 0.65 g/cm³ | 173 psi |
|  | 5.00 min. | 0.65 g/cm³ | 178 psi |
| 160°C. | 4.0 min. | 0.64 g/cm³ | 164 psi |
|  | 4.5 min. | 0.65 g/cm³ | 174 psi |
|  | 6.0 min. | 0.65 g/cm³ | 178 psi |

Since the maximum expected bond strength at the core is about 175 psi, Table VI shows that this is achieved at 160° C. at about 4.5 minutes and at 177° C. at about 4 minutes. These values compare well with the values obtained with commercially catalyzed or uncatalyzed boards which are, at 177° C. at 6 and 5 minutes, respectively, and at 160° C. at 5 and about 6 minutes, respectively.

With the demonstrated usefl pot life of the new catalyst resin mixture, it will be apparent that cyclohexylammonium N-cyclohexylsulfamate is particularly useful in areas where large batches of material are required to be mixed at one time for later use, e.g., in industries where the final shaping equipment uses relatively small amounts of the catalyst/resin mixture. However, the most striking advantage of the new catalyst is the tackiness that is attained in the catalyst/resin mixture without unduly increasing its viscosity. This is of great advantage in the particle board industry where no caul is present on top of the mat while this mat is being moved over rollers from the press loader into the heating press. The new mixture has enough tack to hold the mat together while it goes over these rollers while older catalysts give a dryer mat. Such dry mats have less tack and many fall apart during this loading operation, requiring stoppage of the whole loading process. The new catalyst therefore greatly increases the efficiency of the equipment used in industries where tackiness of a resin mixture is required and a long pot life is desired.

What is claimed is:

1. The process of curing formaldehyde/urea resins comprising adding to said resin between 0.1 and 5.0 percent by weight of cyclohexylammonium N-cyclohexylsulfamate at room temperature and heating the mixture to a temperature of 100°–250° C. for several minutes.

2. The process of claim 1 wherein said cyclohexylammonium N-cyclohexylsulfamate is added to said resin as an aqueous solution.

3. The process of claim 1 wherein said mixture is buffered by the addition of between 0.1 and 5 percent by weight of an organic or inorganic buffer, based on the amount of the resin mixture.

4. The process of claim 3 wherein said buffer is ammonium hydroxide used in an amount of 1–4 percent by weight of the resin mixture.

5. The process of claim 3 wherein said buffer is triethylamine used in an amount of 0.1 to 1.0 percent by weight of the resin mixture.

6. The process of claim 1 wherein said resin is cured after being thoroughly mixed with wood particles suitable for making particle board.

7. The process of claim 6 wherein said resin and said wood particles are mixed in weight ratio of between 1:10 to 1:20.

* * * * *